(12) United States Patent
Fu et al.

(10) Patent No.: US 9,967,880 B2
(45) Date of Patent: *May 8, 2018

(54) METHOD AND APPARATUS OF DATA TRANSMISSION OVER GUARD SUB-CARRIERS IN MULTI-CARRIER OFDM SYSTEMS

(71) Applicant: MEDIATEK INC., Hsinchu (TW)

(72) Inventors: I-Kang Fu, Taipei (TW); Po-Yuen Cheng, San Jose, CA (US); Pei-Kai Liao, Nantou County (TW)

(73) Assignee: MEDIATEK INC., Hsin-Chu (TW)

( * ) Notice: Subject to any disclaimer, the term of this patent is extended or adjusted under 35 U.S.C. 154(b) by 162 days.

This patent is subject to a terminal disclaimer.

(21) Appl. No.: 14/515,752

(22) Filed: Oct. 16, 2014

(65) Prior Publication Data

US 2015/0036629 A1 Feb. 5, 2015

Related U.S. Application Data

(63) Continuation of application No. 12/459,720, filed on Jul. 6, 2009, now Pat. No. 8,891,350.

(Continued)

(51) Int. Cl.
*H04W 36/00* (2009.01)
*H04W 72/04* (2009.01)
(Continued)

(52) U.S. Cl.
CPC ......... *H04W 72/0453* (2013.01); *H04J 11/00* (2013.01); *H04L 5/001* (2013.01);
(Continued)

(58) Field of Classification Search
None
See application file for complete search history.

(56) References Cited

U.S. PATENT DOCUMENTS 7,046,617 B2    5/2006  Rotstein et al. ............. 370/203
7,839,880 B2   11/2010  Seki ............................ 370/430
(Continued)

FOREIGN PATENT DOCUMENTS

CN    1671076 A    9/2005
CN    1813446 A    8/2006
(Continued)

OTHER PUBLICATIONS

SIPO, Office Action for the CN patent application 201210328171.8 dated Dec. 1, 2014 (8 pages).
(Continued)

*Primary Examiner* — Brandon Renner
(74) *Attorney, Agent, or Firm* — Imperium Patent Works; Zheng Jin

(57) ABSTRACT

A method of data transmission over guard sub-carriers is provided in a multi-carrier OFDM system. Adjacent radio frequency (RF) carriers are used to carry radio signals transmitted through adjacent frequency channels. A plurality of guard sub-carriers between adjacent frequency channels are aligned and identified for data transmission in a predefined physical resource unit. The identified guard sub-carriers do not overlap with normal data sub-carriers of the radio signals transmitted through the adjacent frequency channels. At least one of the identified guard sub-carriers is reserved as NULL sub-carrier. A flexible multi-carrier transceiver architecture is also provided in a multi-carrier OFDM system. Different multi-carrier and/or MIMO/SISO data transmission schemes are implemented by adaptively reconfigure same hardware modules including common MAC layer module, physical layer entities, and RF entities. Furthermore, the flexible multi-carrier transceiver architecture can be used to support data transmission over guard sub-carriers.

15 Claims, 11 Drawing Sheets

Related U.S. Application Data

(60) Provisional application No. 61/078,535, filed on Jul. 7, 2008.

(51) Int. Cl.
*H04L 27/26* (2006.01)
*H04L 5/00* (2006.01)
*H04J 11/00* (2006.01)
*H04W 72/02* (2009.01)
*H04L 25/03* (2006.01)

(52) U.S. Cl.
CPC .......... *H04L 5/0007* (2013.01); *H04L 5/0023* (2013.01); *H04L 5/0039* (2013.01); *H04L 5/0044* (2013.01); *H04L 5/0048* (2013.01); *H04L 5/0053* (2013.01); *H04L 25/03343* (2013.01); *H04L 25/03821* (2013.01); *H04L 27/2626* (2013.01); *H04L 27/2646* (2013.01); *H04W 72/02* (2013.01); *H04L 27/2666* (2013.01)

(56) References Cited

U.S. PATENT DOCUMENTS

| | | | |
|---|---|---|---|
| 2003/0045259 A1 | 3/2003 | Kimata | 455/260 |
| 2004/0092256 A1* | 5/2004 | Keller | H04W 16/02 455/422.1 |
| 2004/0125880 A1 | 7/2004 | Emami et al. | 375/260 |
| 2004/0141548 A1 | 7/2004 | Shattil | 375/146 |
| 2004/0228270 A1 | 11/2004 | Chen et al. | 370/208 |
| 2004/0246994 A1 | 12/2004 | Munoz et al. | 370/484 |
| 2005/0220215 A1 | 10/2005 | Tanabe et al. | 375/295 |
| 2005/0227728 A1* | 10/2005 | Trachewsky | H04B 1/406 455/552.1 |
| 2006/0018249 A1 | 1/2006 | Shearer et al. | 370/208 |
| 2006/0121921 A1 | 6/2006 | Tajima et al. | 455/517 |
| 2006/0227812 A1 | 10/2006 | Vrcelj et al. | 370/503 |
| 2006/0239368 A1 | 10/2006 | Hwang et al. | 375/260 |
| 2006/0250940 A1 | 11/2006 | Tirkkonen et al. | 370/208 |
| 2007/0004337 A1 | 1/2007 | Biswas et al. | 455/63.1 |
| 2007/0058738 A1 | 3/2007 | Mahadevappa et al. | 375/260 |
| 2007/0076583 A1 | 4/2007 | Hadad | 370/203 |
| 2007/0091984 A1* | 4/2007 | Batra | H04B 1/7176 375/130 |
| 2007/0140366 A1 | 6/2007 | Rore | 375/260 |
| 2007/0206504 A1 | 9/2007 | Koo et al. | 370/245 |
| 2007/0230328 A1 | 10/2007 | Saitou | 370/210 |
| 2007/0232358 A1 | 10/2007 | Sherman | 455/560 |
| 2007/0286064 A1 | 12/2007 | Yu et al. | 370/208 |
| 2008/0025211 A1 | 1/2008 | Karaoguz et al. | 370/229 |
| 2008/0037540 A1 | 2/2008 | Ngo et al. | 370/392 |
| 2008/0056183 A1 | 3/2008 | Gorokhov et al. | 370/329 |
| 2008/0068999 A1 | 3/2008 | Ishii et al. | 370/235 |
| 2008/0159323 A1 | 7/2008 | Rinne et al. | 370/431 |
| 2008/0161025 A1 | 7/2008 | Imai | 455/464 |
| 2008/0240275 A1 | 10/2008 | Cai | 375/260 |
| 2008/0260004 A1 | 10/2008 | Batra et al. | 375/146 |
| 2008/0298326 A1 | 12/2008 | Pande et al. | 370/329 |
| 2008/0310484 A1 | 12/2008 | Shattil | 375/146 |
| 2008/0317150 A1 | 12/2008 | Alexander et al. | 375/260 |
| 2009/0060081 A1 | 3/2009 | Zhang et al. | 375/267 |
| 2009/0161771 A1 | 6/2009 | Schwoerer et al. | 375/260 |
| 2009/0202010 A1 | 8/2009 | Fu et al. | 375/260 |
| 2010/0003990 A1* | 1/2010 | Suemitsu | H04W 72/02 455/442 |
| 2010/0111226 A1 | 5/2010 | Ko et al. | 375/299 |
| 2010/0157940 A1* | 6/2010 | Shitara | H04J 11/0069 370/331 |
| 2010/0159841 A1 | 6/2010 | Barberis et al. | 455/67.11 |
| 2010/0246377 A1 | 9/2010 | Zhang et al. | 370/210 |

FOREIGN PATENT DOCUMENTS

| | | |
|---|---|---|
| CN | 101136894 A | 3/2007 |
| CN | 101199172 A | 6/2008 |
| EP | 1715643 A2 | 10/2006 |
| EP | 1762066 | 3/2007 |
| EP | 1903726 A1 | 3/2008 |
| JP | 2000261403 | 9/2000 |
| JP | 2002290364 A | 10/2002 |
| JP | 2002319917 | 10/2002 |
| JP | 2003204317 A | 7/2003 |
| JP | 2006020320 | 1/2006 |
| JP | 2007013547 A | 1/2007 |
| JP | 2007274048 A | 10/2007 |
| TW | 200713937 | 4/2007 |
| TW | 200742312 | 11/2007 |
| TW | 200952407 A1 | 12/2009 |
| WO | WO2006092852 | 9/2006 |
| WO | WO2007022430 A2 | 2/2007 |
| WO | WO2007022430 A3 | 2/2007 |
| WO | WO2008118429 A1 | 3/2007 |

OTHER PUBLICATIONS

India Patent Office, Office Action for the India patent application 1165/MUMNP/2010 dated Mar. 23, 2015 (5 pages).
EPO Search Report for the EP patent application 09710516.7 dated Sep. 30, 2015 (5 pages).
Intellectual Property India, Office Action for the IN application 2649/MUMNP/2010 dated Sep. 28, 2015 (2 pages).
International Search Report and Written Opinion of International Search Authority for PCT/CN2009/072677 dated Sep. 17, 2009 (11 pages).
Office Action dated Jan. 3, 2012 for U.S. Appl. No. 12/369,563 (32 pages).
JP Office Action of JP application 2010-545351, dated Jul. 31, 2012 (5 pages).
Considerations on IEEE 802.16m OFDMA Numerology, IEEE 5802.16m-08/080, Qu Hongyun, Jerry Chow, Sean Cai, Fang Huiying, Xu Ling, ZTE Corporation, date Jan. 22, 2008 (12 pages).
Taiwan Intellectual Property Office, Examination Opinion for Taiwan patent application 098104426 dated Oct. 18, 2012 (12 pages).
The Japanese patent office, Office Action of Japanese patent application 2011-515080 dated Nov. 13, 2012 (9 pages).
The Taiwan Intellectual Property office, the Examination Opinion of Taiwan patent application 098122908 dated Nov. 29, 2012 (8 pages).
SIPO, the Third Examination Opinion of the Chinese patent application 200980000277.1 dated Dec. 5, 2012 (7 pages).
The Taiwan Intellectual Property office, the Examination Opinion of Taiwan patent application 098122908 dated May 15, 2013 (5 pages).
IEEE 802.16m-08/003r3, The Draft IEEE 802.16m System Description Document, pp. 46-48, Fig. 28; Jun. 16, 2008 (4 pages).
Office Action of JP patent application 2013-024225 dated Dec. 10, 2013 (4 pages).
Taiwan IPO, Office Action of TW application 101141728 dated Aug. 22, 2014 (6 pages).
3GPP TS 36.211 V8.3.0 (May 2008), 3rd Generation Partnership Project; Technical specification Group Radio Access Network; Evolved Universal Terrestrial Radio Access (E-UTRA); Physical Channels and Modulation (Release 8) p. 12 5.2.1.
EPO Search Report for the EP patent application 09793848.4 dated Mar. 15, 2016 (5 pages).

\* cited by examiner

METHOD AND APPARATUS OF DATA TRANSMISSION OVER GUARD SUB-CARRIERS IN MULTI-CARRIER OFDM SYSTEMS

CROSS REFERENCE TO RELATED APPLICATIONS

This application is a continuation, and claims priority under 35 U.S.C. § 120 from nonprovisional U.S. patent application Ser. No. 12/459,720, entitled "Method and Apparatus of Data Transmission over Guard Sub-carriers in Multi-carrier OFDM Systems," filed on Jul. 6, 2009, the subject matter of which is incorporated herein by reference; application Ser. No. 12/459,720, in turn, claims priority under 35 U.S.C. § 119 from U.S. Provisional Application No. 61/078,535, entitled "Subsidiary Communication in Multi-band OFDMA Systems," filed on Jul. 7, 2008, the subject matter of which is incorporated herein by reference.

TECHNICAL FIELD

The disclosed embodiments relate generally to wireless network communications, and, more particularly, to data communication over guard sub-carriers and flexible radio frequency transceiver architecture in multi-carrier OFDM systems.

BACKGROUND

In current wireless communications systems, 5 MHz~10 MHz radio bandwidths are typically used for up to 100 Mbps peak transmission rate. Much higher peak transmission rate is required for next generation wireless systems. For example, 1 Gbps peak transmission rate is required by ITU-R for IMT-Advanced systems such as the 4$^{th}$ generation ("4G") mobile communications systems. The current transmission technologies, however, are very difficult to perform 100 bps/Hz transmission spectrum efficiency. In the foreseeable next few years, only up to 15 bps/Hz transmission spectrum efficiency can be anticipated. Therefore, much wider radio bandwidths (i.e., at least 40 MHz) will be necessary for next generation wireless communications systems to achieve 1 Gbps peak transmission rate.

Orthogonal Frequency Division Multiplexing (OFDM) is an efficient multiplexing scheme to perform high transmission rate over frequency selective channel without the disturbance from inter-carrier interference. There are two typical architectures to utilize much wider radio bandwidth for OFDM system. In a traditional OFDM system, a single radio frequency (RF) carrier is used to carry one wideband radio signal, and in an OFDM multi-carrier system, multiple RF carriers are used to carry multiple narrower band radio signals. An OFDM multi-carrier system has various advantages as compared to a traditional OFDM system such as easier backward compatibility, better reuse on legacy single-carrier hardware design, more mobile station hardware flexibility, and lower Peak to Average Power Ratio (PAPR) for uplink transmission. Thus, OFDM multi-carrier systems have become the baseline system architecture in IEEE 802.16m and 3GPP LTE-Advanced draft standards to fulfill system requirements.

FIG. 1 (Prior Art) illustrates a typical architecture to utilize much wider radio bandwidth for OFDM multi-carrier system 11. In OFDM multi-carrier system 11, multiple RF carriers are used to carry multiple radio signals with narrower bandwidth (called narrower band radio signal). In the example of FIG. 1, the total radio bandwidth of OFDM multi-carrier system 11 is 40 MHz, and four RF carriers #1-#4 are used to carry four narrower band radio signals #1-#4, each transmitted through a corresponding 10 MHz frequency channel #1-#4 (i.e., 10 MHz Bandwidth, 1024 FFT). For each RF carrier, the overall radio bandwidth is further partitioned into a large number of sub-carriers, which are closely spaced and orthogonal to each other for data transmission. When there are contiguous frequency channels used for data transmission, sub-carriers in between adjacent frequency channels may be overlap with each other. Therefore, overlapping sub-carriers located in between adjacent frequency channels are typically reserved as guard sub-carriers to prevent signal interference.

As illustrated in FIG. 1, at both end of each frequency channel, a certain number of sub-carriers are reserved as NULL sub-carriers such that they are not used for data transmission. However, if both adjacent frequency channels are controlled and managed by the same base station, then it is not necessary to have those overlapping sub-carriers in between adjacent frequency channels to be reserved as guard sub-carriers. Instead, the guard sub-carriers in between adjacent frequency channels may be used for data transmission such that overall system throughput can be increased. For example, in IEEE 802.16m wireless communications systems, allowing data transmission over guard sub-carriers can increase system throughput by 2.08% for two contiguous 10 MHz frequency channels, by 2.77% for three contiguous 10 MHz frequency channels, and by 3.125% for four contiguous 10 MHz frequency channels. It is thus desirable to enable data transmission over guard sub-carriers to increase overall system throughput and peak transmission rate.

SUMMARY

In a first novel aspect, a method of data transmission over guard sub-carriers is provided in a multi-carrier OFDM system. Adjacent radio frequency (RF) carriers are used to carry radio signals transmitted through adjacent frequency channels. A plurality of guard sub-carriers between adjacent frequency channels are aligned and identified for data transmission in a pre-defined physical resource unit. The identified guard sub-carriers do not overlap with normal data sub-carriers of the radio signals transmitted through the adjacent frequency channels. At least one of the identified guard sub-carriers is reserved as NULL sub-carrier. Overall system throughput is increased by utilizing guard sub-carriers for data transmission.

In one embodiment, a serving base station periodically transmits a reference signal over the guard sub-carriers that are utilized for data transmission. The use of the reference signal saves overhead on MAC message indication and provides flexibility for various guard sub-carrier allocation scenarios. In another embodiment, a Subsidiary Carrier consisting of aggregated guard sub-carriers utilized for data transmission is defined. By defining the Subsidiary Carrier, the serving base station may use a simple MAC layer indication to indicate whether guard sub-carriers are supported for data transmission with a particular mobile station.

In a second novel aspect, a flexible multi-carrier transceiver architecture is provided in a multi-carrier OFDM system. Different multi-carrier and/or MIMO/SISO data transmission schemes are implemented by adaptively reconfigure same hardware modules including a common MAC layer module, an adaptive multi-carrier controller, multiple physical layer entities, and multiple RF entities. In a first embodiment, a single-carrier 4×4 MIMO data transmission scheme is supported; in a second embodiment, a multi-carrier (two RF carriers) 2×2 MIMO data transmission scheme is supported; and in a third embodiment, a multi-carrier (four RF carriers) SISO data transmission scheme is supported. The number of antennas for MIMO transmission over each frequency channel is the total number of RF entities divided by the number of supported active frequency channels.

Furthermore, the flexible multi-carrier transceiver architecture can be used to support data transmission over guard sub-carriers. In one embodiment, a mobile station supports two contiguous 10 MHz frequency channels. In one example, its transceiver hardware is implemented by utilizing two 1024 FFTs and two 10 MHz bandwidth RF filters to transmit and receive 2×10 MHz OFDMA signals through two adjacent frequency channels. In another example, its transceiver hardware is implemented by utilizing a single 2048 FFT and one 20 MHz bandwidth RF filer to transmit and receive 2×10 MHz OFDMA signals through two adjacent frequency channels. Under the second implementation, the overlapped sub-carriers are always aligned and the mobile station can easily transmit/receive radio signals over the guard sub-carriers between the two adjacent frequency channels.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
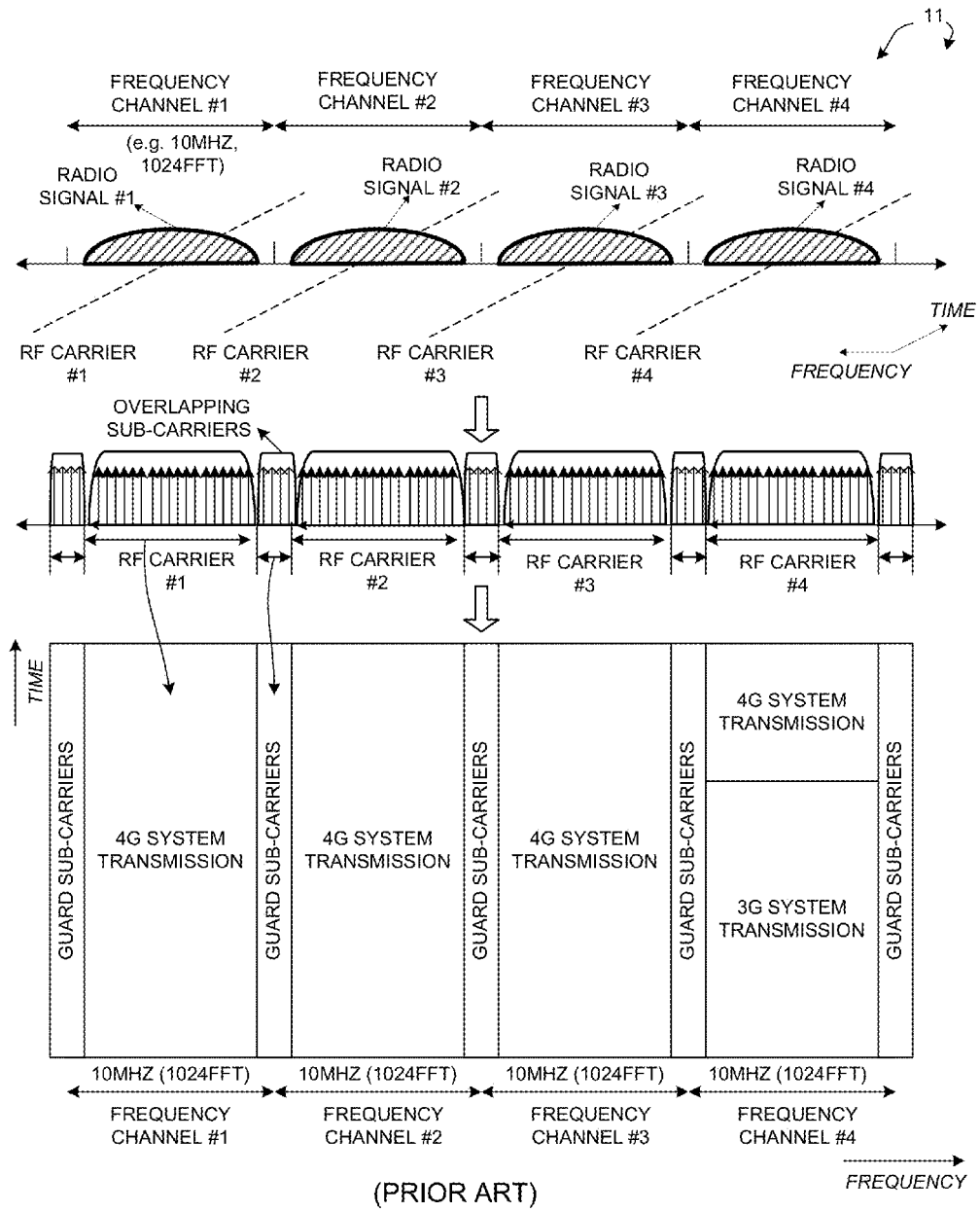
FIG. 1 (Prior Art) illustrates a typical architecture to utilize much wider radio bandwidth for a multi-carrier OFDM system.
Figure 2:
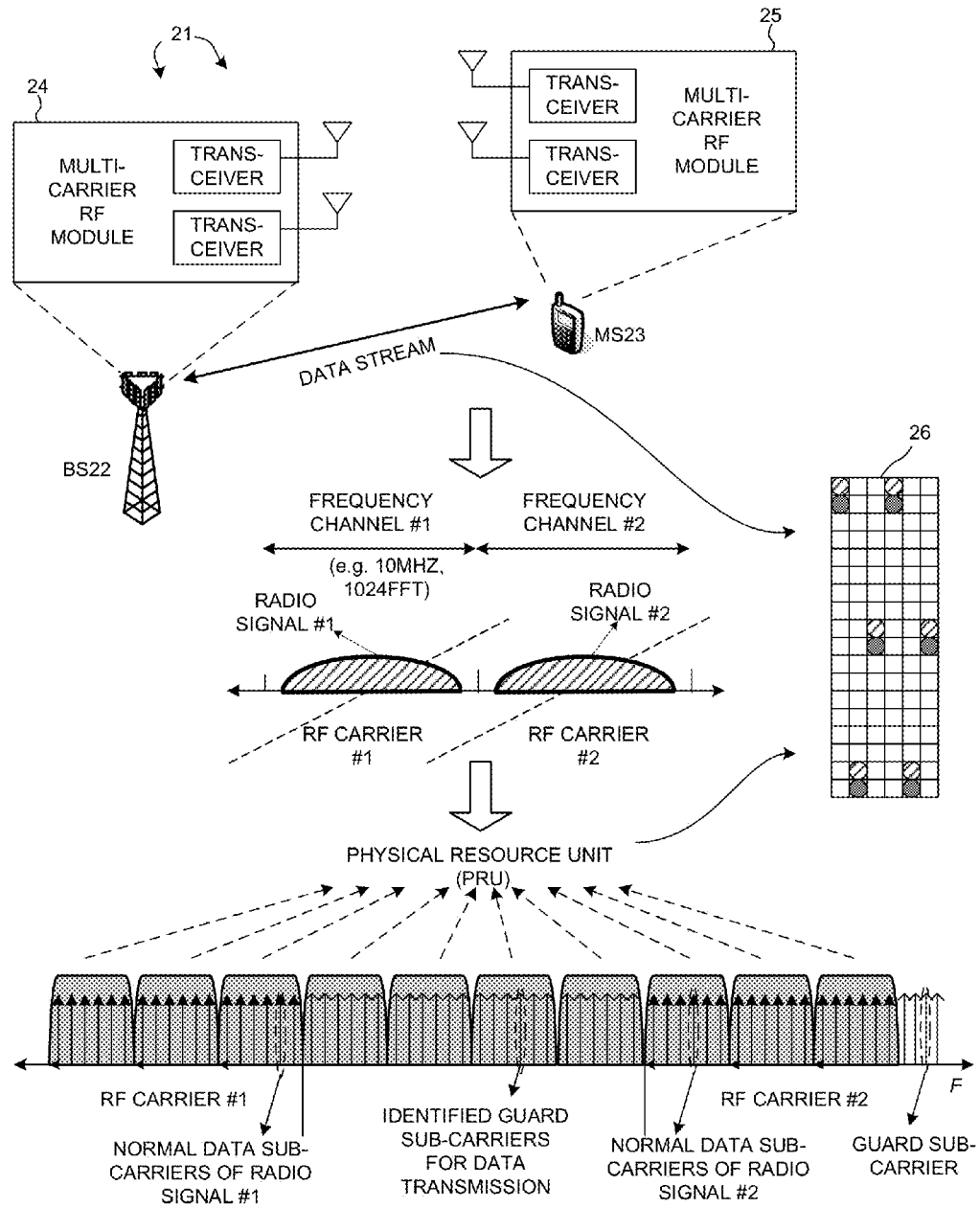
FIG. 2 illustrates a method of data transmission over guard sub-carriers in a multi-carrier wireless system in accordance with a first novel aspect.

FIG. 2 illustrates a method of data transmission over guard sub-carriers in a multi-carrier Orthogonal Frequency Division Multiplexing (OFDM) wireless communications system 21 in accordance with a first novel aspect. Wireless system 21 comprises a multi-carrier base station BS22 and a multi-carrier mobile station MS23. BS22 comprises a multi-carrier radio frequency (RF) module 24 coupled to a plurality of antennas, supporting multiple RF carriers for data transmission. MS23 comprises a multi-carrier RF module 25 coupled to a plurality of antennas, supporting multiple RF carriers for data transmission. In the example of FIG. 2, two contiguous radio RF carriers #1 and #2 are used to carry two radio signals #1 and #2, each transmitted through a corresponding 10 MHz frequency channel #1-#2 (i.e., 10 MHz Bandwidth, 1024 FFT) respectively. For each frequency channel, the overall radio bandwidth is further partitioned into a large number of sub-carriers, which are closely spaced and orthogonal to each other for data transmission over each radio signal. As illustrated in FIG. 2, in multi-carrier OFDM wireless system 21, data streams are communicated between BS22 and MS23 using a pre-defined physical resource unit (PRU) 26, comprising a number of consecutive sub-carriers in frequency domain and a number of consecutive OFDM symbols in time domain. Those sub-carriers used for data transmission are referred to as normal data sub-carriers.

When there are contiguous RF carriers (e.g., RF carriers #1 and #2) used for data transmission, sub-carriers located at both end of each frequency channel may be overlap with each other. To prevent signal interference, those sub-carriers are reserved as guard sub-carriers. Typically, guard sub-carriers are configured as NULL sub-carriers and cannot be used for data transmission. In one novel aspect, with more details described below with respect to FIG. 3, a certain number of the originally reserved guard sub-carriers are aligned and then identified to support data transmission using a pre-defined PRU. In the example of FIG. 2, PRU 26 comprises eighteen consecutive sub-carriers and six consecutive OFDM symbols. The same PRU size is used for data transmission over normal data sub-carriers as well as the identified guard sub-carriers. In addition, the same pilot pattern designed for normal data sub-carriers can also be used for the identified guard sub-carriers.

Figure 3:
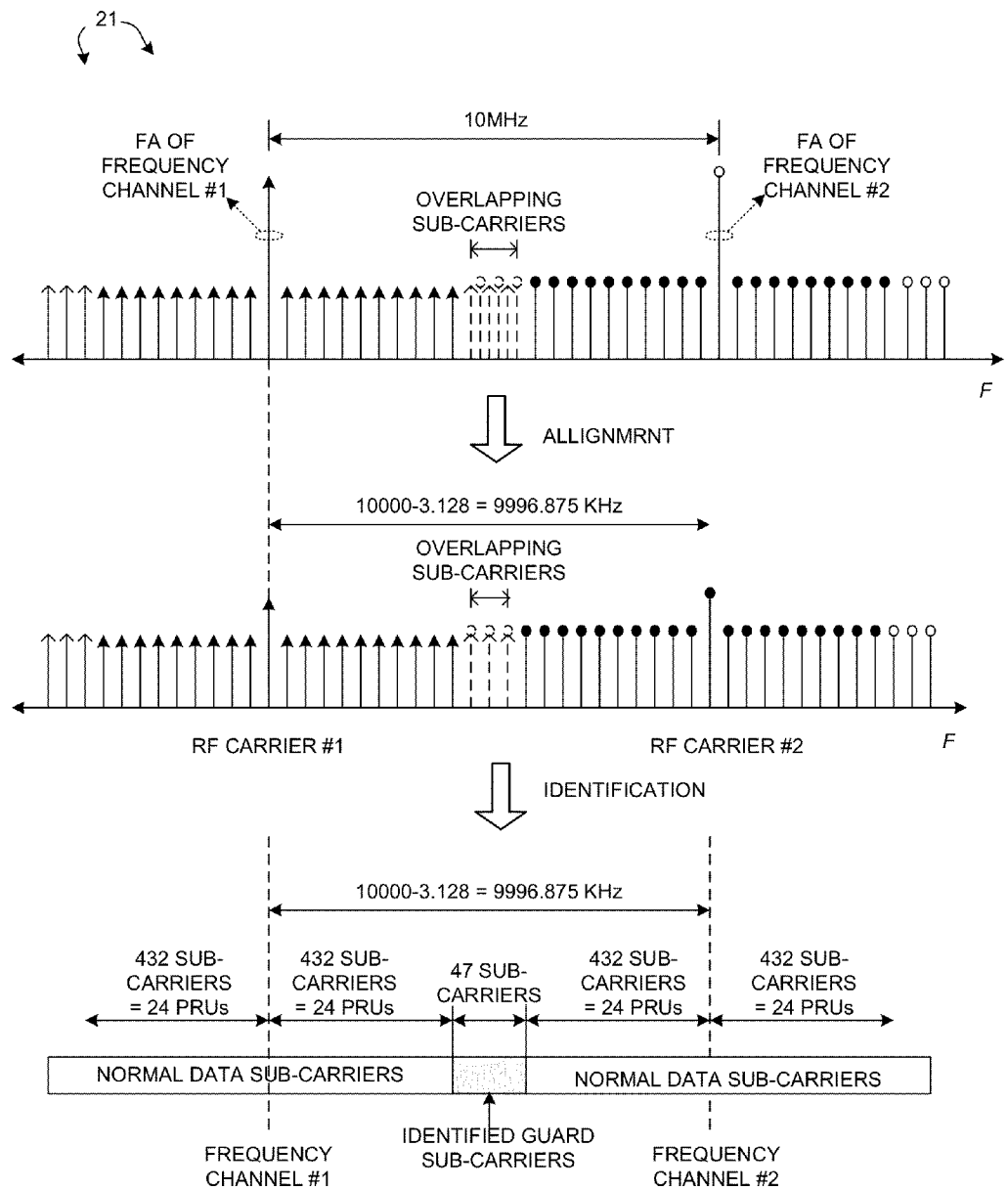
FIG. 3 illustrates a method of aligning and indentifying guard sub-carriers for data transmission.

FIG. 3 illustrates a method of aligning and indentifying guard sub-carriers for data transmission in wireless system 21. As illustrated in FIG. 3, the overlapped guard sub-carriers between adjacent frequency channels #1 and #2 can be utilized for data transmission only if the sub-carriers of radio signal #1 transmitted through frequency channel #1 are well aligned with the sub-carriers of radio signals transmitted through adjacent frequency channels (e.g., radio signal #2 transmitted through frequency channel #2) in frequency domain. Alignment can be achieved by applying a frequency offset over the RF carrier frequency of the radio signals. In the example of FIG. 3, a 3.128 KHz frequency offset is applied over the RF carrier frequency of radio signal #2 to make it shifted from the center frequency of frequency channel #2 in order to align the overlapped guard sub-carriers of the radio signal transmitted through two adjacent 10 MHz frequency channels. For more details on sub-carrier alignment, see related documents such as IEEE 802.16m-09/0267r1, "Text Input for Sub-Carrier Alignment based on P802.16m SDD", the subject matter of which is incorporated herein by reference.

After sub-carrier alignment, additional computation is performed such that only those guard sub-carriers that do not overlap with normal data sub-carriers are available for data transmission. In the example of FIG. 3, each frequency channel comprises 864 (2*432) sub-carriers, which is partitioned into 48 (2*24) PRUs for data transmission. In this particular example, forty-seven guard sub-carriers in between the two adjacent frequency channels #1 and #2 do not overlap with normal data sub-carriers of radio signal #1 and #2. Those guard sub-carriers are identified by wireless system 21 as sub-carriers that can be used for data transmission. There are many nominal frequency channel bandwidths considered by IEEE 802.16m, including 5, 7, 8.75, 10 and 20 MHz. Each combination of different bandwidth for adjacent frequency channels will result in different number of available guard sub-carriers for data transmission. It will thus result in high overhead if wireless system 21 needs to explicitly signaling all the possible numbers of available guard sub-carrier under different combinations.

In accordance with the first novel aspect, the identified guard sub-carriers are partitioned into PRUs for data transmission. The same PRU size and pilot pattern designed for normal data sub-carriers can be reused for the identified guard sub-carriers. By reusing the same PRU size and pilot pattern, certain physical layer design such as channel estimation algorithm can also be reused. Furthermore, hardware complexity and signaling overhead is reduced because signaling can be performed in a predefine PRU size rather than in an arbitrary number.

Figure 4:
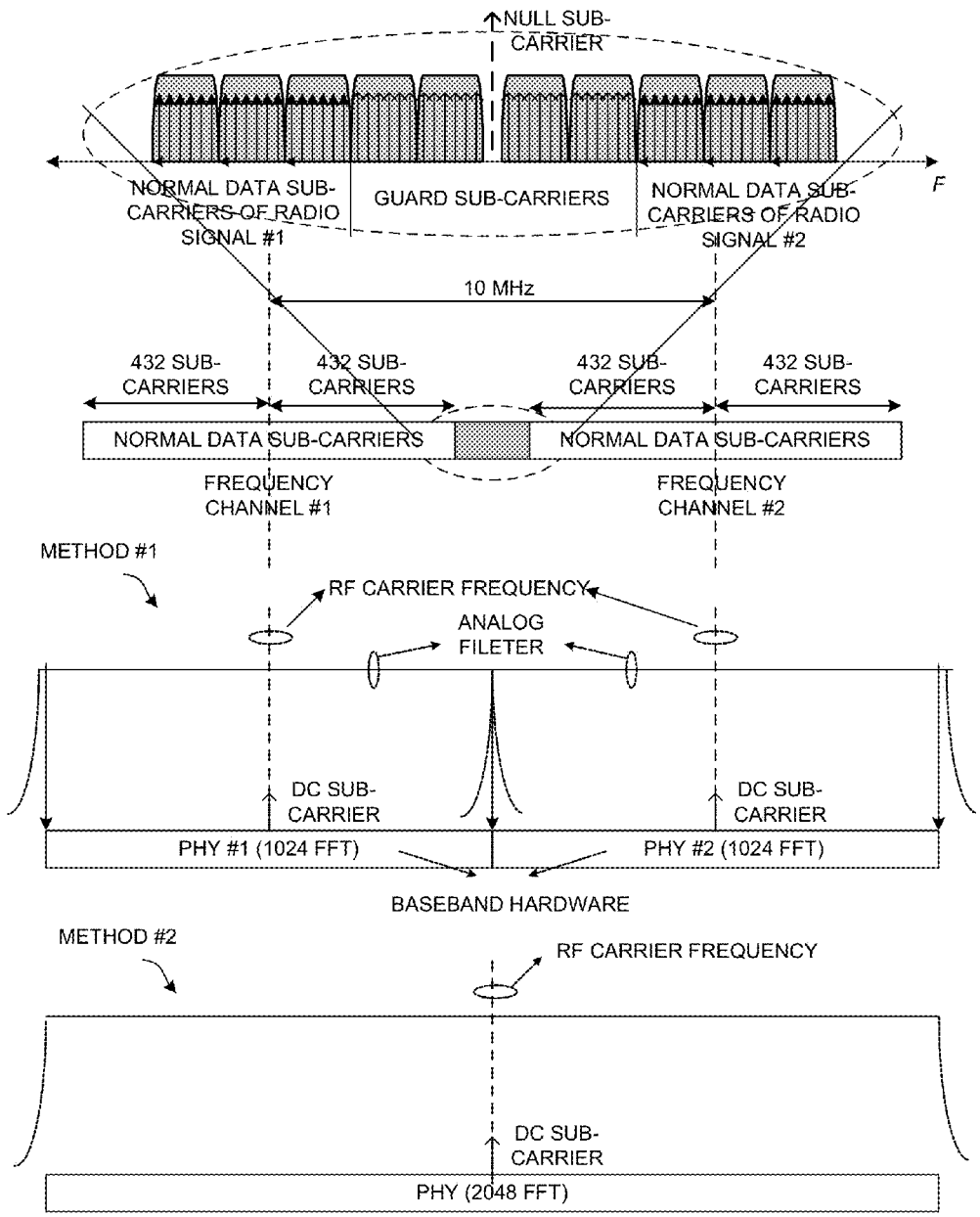
FIG. 4 illustrates a method of reserving a guard sub-carrier as a null sub-carrier when supporting data transmission.

FIG. 4 illustrates a method of reserving at least one guard sub-carrier as NULL sub-carrier when supporting data transmission. There are two different hardware methods to implement data transmission over two contiguous frequency channels. In method #1, two separate physical layer modules (PHY#1 and PHY#2) are used as the baseband hardware modules to utilize two 1024 FFT and two 10 MHz RF filters to transmit/receive 2×10 MHz OFDMA radio signals over two adjacent frequency channels. The RF carrier frequency of each frequency channel, referred to as direct current (DC) sub-carrier, needs to be reserved as NULL sub-carrier to avoid signal interference. In method #2, one single physical layer module (PHY) is shared as the baseband hardware module to utilize a 2048 FFT and a 20 MHz bandwidth RF filter to transmit/receive 2×10 MHz OFDMA radio signals in parallel over two adjacent frequency channels. Similar to method #1, The RF carrier frequency (DC sub-carrier) under method #2 also needs to be reserved as NULL sub-carrier to avoid signal interference. In method 2, however, the DC sub-carrier belongs to one of the identified guard sub-carriers. Thus, to ensure proper data transmission, at least one indentified guard sub-carrier needs to be reserved as NULL sub-carrier.

Figure 5:
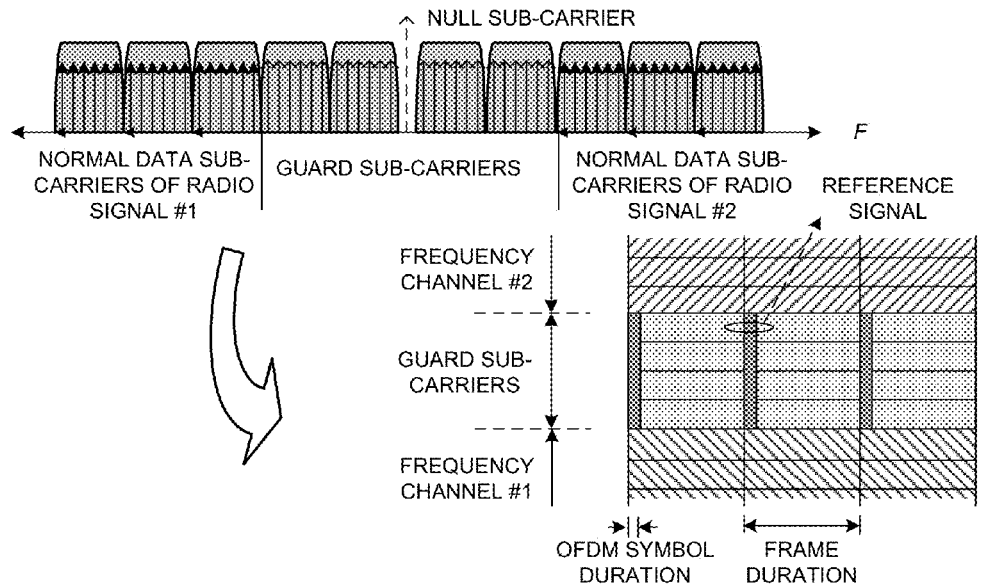
FIG. 5 illustrates one embodiment of transmitting a reference signal over guard sub-carriers.
Figure 6:
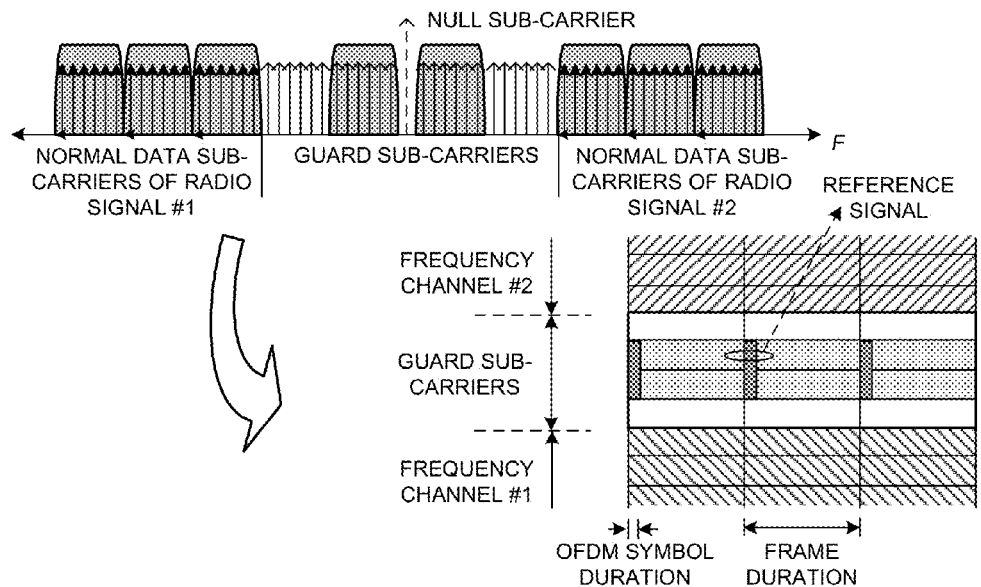
FIG. 6 illustrates another embodiment of transmitting a reference signal over guard sub-carriers.

FIGS. 5-6 illustrate two examples of transmitting a reference signal over guard sub-carriers. Among guard sub-carries available for data transmission, the serving base station still need to communicate with the mobile stations on which guard sub-carriers are actually allocated and utilized for data transmission. Using a MAC message to indicate such allocation explicitly may result in high overhead. Instead, the serving base station periodically transmits a reference signal (e.g., preamble) over the guard sub-carriers that are used for data transmission such that the mobile stations may detect the location of the utilized guard sub-carriers. In the example of FIG. 5, all identified guard subcarriers are utilized for data transmission. In the example of FIG. 6, only some of the identified guard sub-carriers are utilized for data transmission. In both examples, the serving base station periodically transmits a reference signal over the utilized guard sub-carriers to indicate the location of the utilized guard sub-carriers. The use of the reference signal saves overhead on MAC message indication and provides flexibility for various allocation scenarios.

Figure 7:
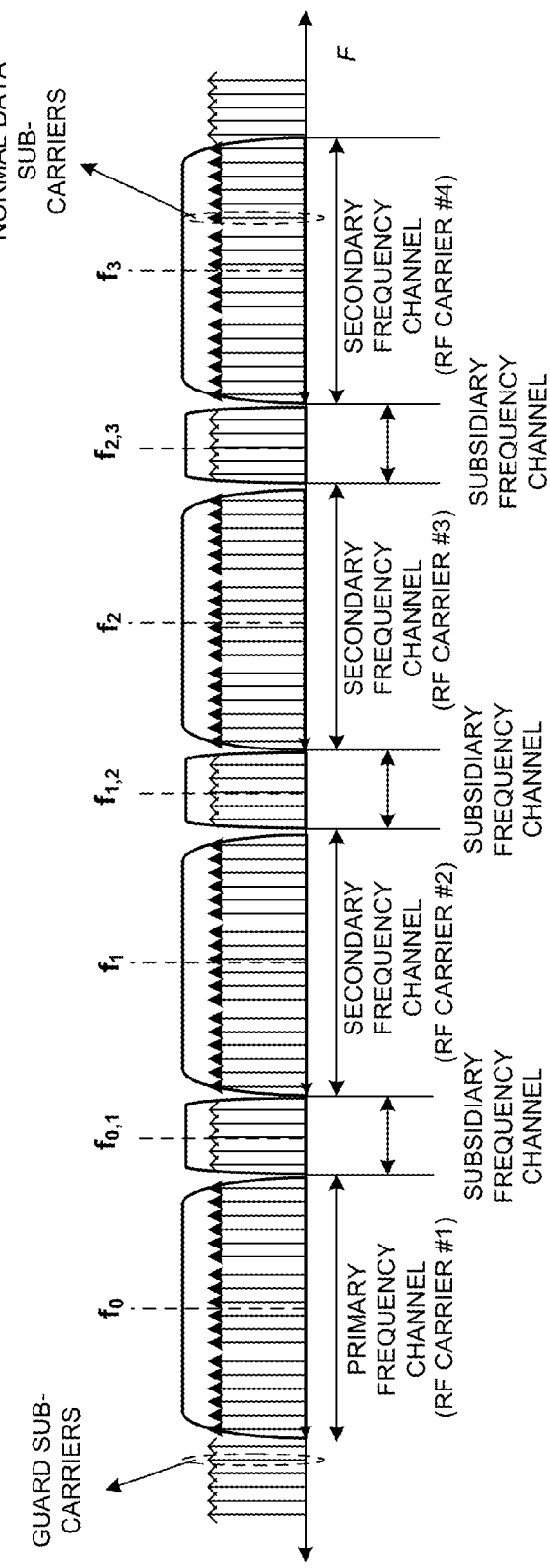
FIG. 7 illustrates a Subsidiary Frequency Channel that consists of aggregated guard sub-carriers.

FIG. 7 illustrates a Subsidiary Frequency Channel that consists of aggregated guard sub-carriers. In the example of FIG. 7, Frequency channels #1 is configured as a Primary Frequency Channel, which includes all control channel configuration for synchronization, broadcast, multicast and unicast of control signals. Frequency channel #2-#4 are configured as Secondary Frequency Channels, which include only essential control channel configuration. The identified guard sub-carriers in between contiguous frequency channels are aggregated and identified as Subsidiary Frequency Channel, which may have the same control channel configuration as the Secondary Frequency Channels. By defining the Subsidiary Frequency Channels, the serving base station may use a simple MAC layer indication (e.g., a single bit) to indicate whether guard sub-carriers are used for data transmission with a particular mobile station. If data transmission over guard sub-carriers is supported, then the serving base station may periodically transmits a reference signal over the utilized guard sub-carriers to indicate their locations, as illustrated above with respect to FIGS. 5 and 6.

Figure 8:
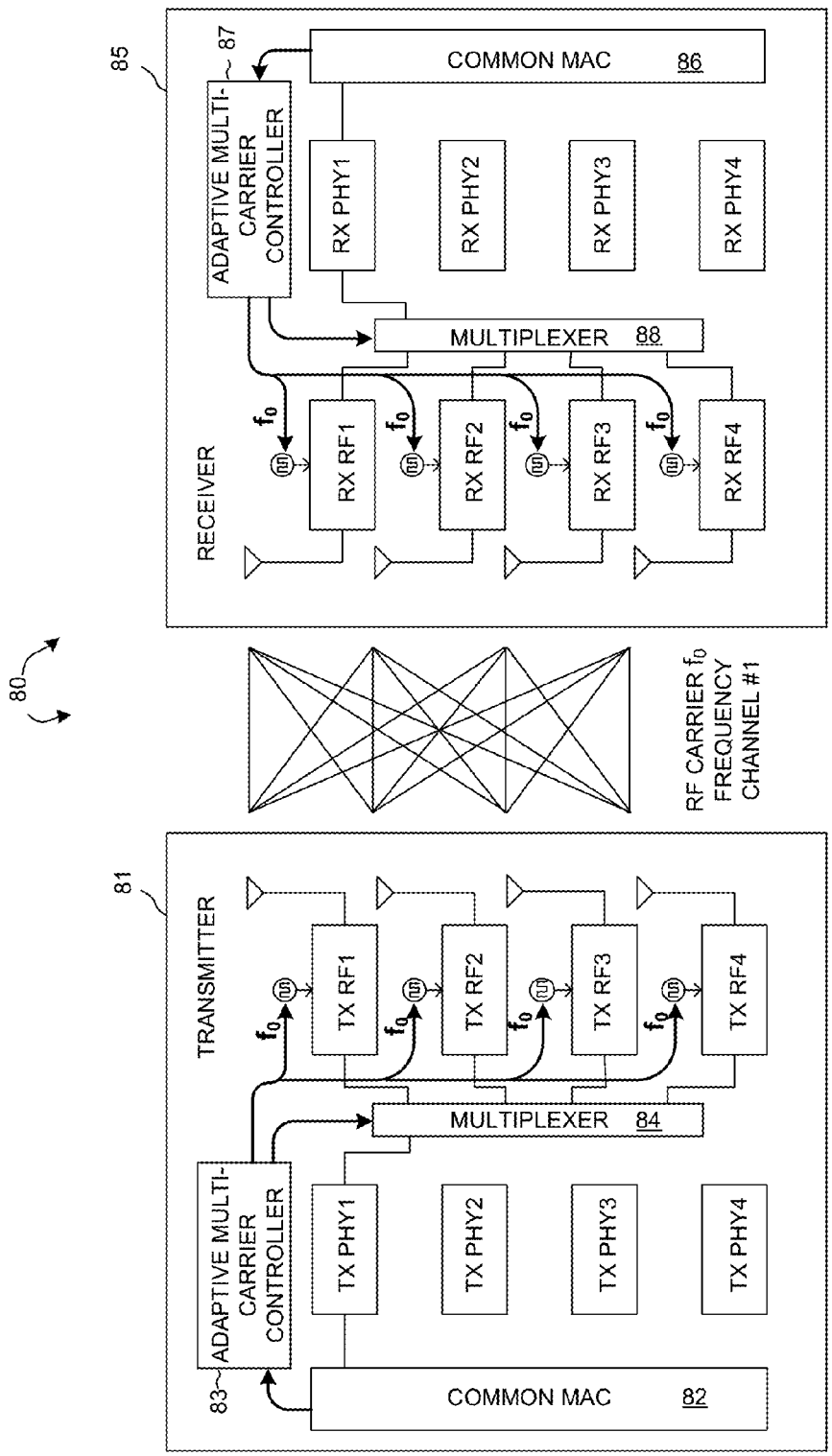
FIG. 8 illustrates one embodiment of the flexible multi-carrier transceiver architecture in a multi-carrier wireless system.

In a second novel aspect, a flexible multi-carrier transceiver architecture is provided to support multi-carrier transmission in wireless systems. FIG. 8 illustrates one embodiment of the flexible multi-carrier transceiver architecture in a multi-carrier wireless system 80. Multi-carrier system 80 comprises a wireless transmitter 81 for data transmission and a wireless receiver 85 for data reception. Transmitter 81 comprises a common MAC control entity 82, an adaptive multi-carrier controller 83, a multiplexer 84, a plurality of transmitting physical layer entities TXPHY1-TXPHY4, and a plurality of transmitting RF entities TXRF1-TXRF4 coupled to a plurality of antennas to transmit radio signals. Similarly, receiver 85 comprises a common MAC control entity 86, an adaptive multi-carrier controller 87, a multiplexer 88, a plurality of receiving physical layer entities RXPHY1-RXPHY4, and a plurality of receiving RF entities RXRF1-RXRF4 coupled to a plurality of antennas to receive radio signals.

For transmitter 81, common MAC controller 82 configures adaptive multi-carrier controller 83 and transmitting physical layer entities TXPHY1-TXPHY4 to process radio signals carried by a number of RF carriers and transmitted through a corresponding frequency channel. In addition, adaptive multi-carrier controller 83 controls the RF carrier frequencies of transmitting RF entities TXRF1-TXRF4; each transmitting RF entity is operable to transmit a radio signal through the corresponding frequency channel. Similarly, for receiver 85, common MAC controller 86 configures adaptive multi-carrier controller 87 and receiving physical layer entities RXPHY1-RXPHY4 to process radio signals carried by a number of RF carriers and received through a corresponding frequency channel. In addition, adaptive multi-carrier controller 87 controls the RF carrier frequencies of receiving RF entities RXRF1-RXRF4; each receiving RF entity is operable to receive a radio signal through the corresponding frequency channel.

In the example of FIG. 8, one transmitting physical layer entity TXPHY1 is enabled and coupled to all transmitting RF entities TXRF1-TXRF4 through multiplexer 84. TXPHY1 is configured to process a first radio signal carried by RF carrier #1 and transmitted through one active frequency channel #1. Frequency channel #1 has a RF carrier frequency of $f_0$. In addition, adaptive multi-carrier controller 83 controls each transmitting RF entities TXRF1-TXRF4 to transmit the first radio signal through frequency channel #1 with RF carrier frequency $f_0$. Similar configuration and control are applied for receiving physical layer entity RXPH1 and four receiving RF entities RXRF1-RXRF4. Using such configuration and control, a single-carrier (RF carrier #1) 4×4 multiple-input multiple-output (MIMO) data transmission scheme is supported in multi-carrier wireless system 80.

Figure 9:
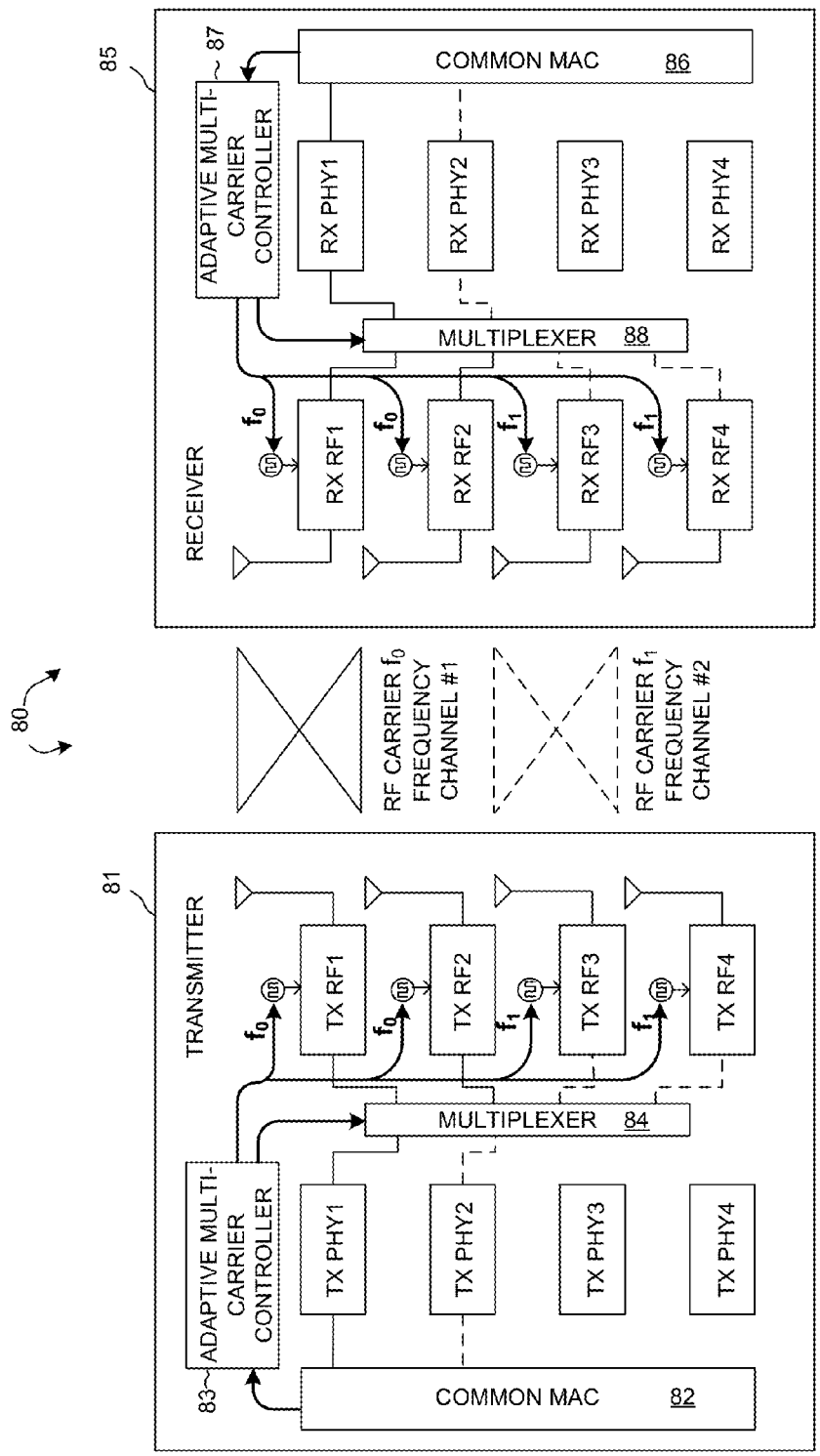
FIG. 9 illustrates a second embodiment of the flexible multi-carrier transceiver architecture in a multi-carrier wireless system.

FIG. 9 illustrates a second embodiment of the flexible multi-carrier transceiver architecture in multi-carrier wireless system 80. In the example of FIG. 9, two transmitting physical layer entities TXPHY1 and TXPHY2 are enabled and coupled to all transmitting RF entities TXRF1-TXRF4 through multiplexer 84. TXPHY1 is configured to process a first radio signal carried by RF carrier #1 and transmitted through active frequency channel #1, and TXPHY2 is configured to process a second radio signal carried by RF carrier #2 and transmitted through active frequency channel #2. Frequency channel #1 has a RF carrier frequency of $f_0$ and frequency channel #2 has a RF carrier frequency of $f_1$. In addition, adaptive multi-carrier controller 83 controls TXRF1-TXRF2 to transmit the first radio signal through active frequency channel #1 with RF carrier frequency $f_0$, and controls TXRF3-TXRF4 to transmit the second radio signal through active frequency channel #2 with RF carrier frequency $f_1$. Similar configuration and control are applied for receiving physical layer entity RXPHY1, RXPHY2, and four receiving RF entities RXRF1-RXRF4. Using such configuration and control, a multi-carrier (RF carrier #1 and RF carrier #2) 2×2 MIMO data transmission scheme is supported in multi-carrier wireless system 80.

Figure 10:
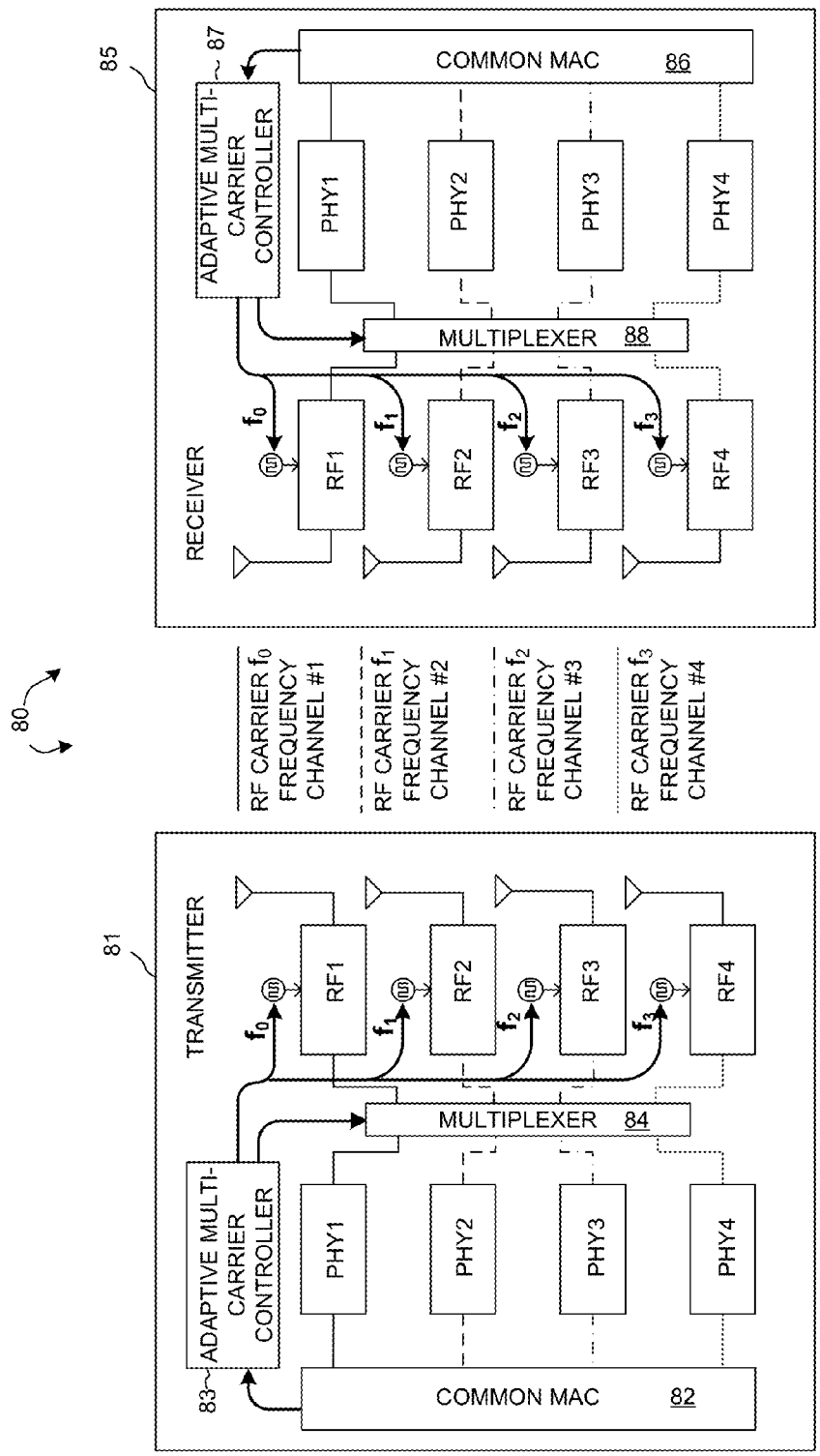
FIG. 10 illustrates a third embodiment of the flexible multi-carrier transceiver architecture in a multi-carrier wireless system.

FIG. 10 illustrates a third embodiment of the flexible multi-carrier transceiver architecture in multi-carrier wireless system 80. In the example of FIG. 10, all four transmitting physical layer entities TXPHY1-TXPHY4 are enabled and coupled to all four transmitting RF entities TXRF1-TXRF4 through multiplexer 84. TXPHY1-TXPHY4 are configured to process four radio signals carried by four different RF carriers (RF carriers #1-#4) and transmitted through four active frequency channels #1-#4 respectively. Frequency channels #1-#4 each has a RF carrier frequency of $f_0$-$f_3$ respectively. In addition, adaptive multi-carrier controller 83 controls TXRF1-TXRF4 to transmit the four radio signals through active frequency channels #1-4 with the RF carrier frequencies of $f_0$-$f_3$ respectively. Similar configuration and control are applied for all four receiving physical layer entity RXPHY1-RXPHY4 and all four receiving RF entities RXRF1-RXRF4. Using the above-described configuration and control, a multi-carrier (RF carriers #1-#4) single-input single-output (SISO) data transmission scheme is supported in multi-carrier wireless system 80.

In accordance with the second novel aspect of the flexible multi-carrier transceiver architecture, wireless system 80 can adaptively reconfigure the desirable data transmission scheme based on the negotiation between the transmitter and the receiver. The same hardware resource, including a MAC layer controller, multiple physical-layer baseband hardware modules, multiple RF transceivers, and multiple antennas, are shared to implement different combination of multi-carrier and/or MIMO/SISO data transmission schemes. The number of antennas to support MIMO transmission over each frequency channel is the total number of RF entities divided by the number of supported active frequency channels.

Figure 11:
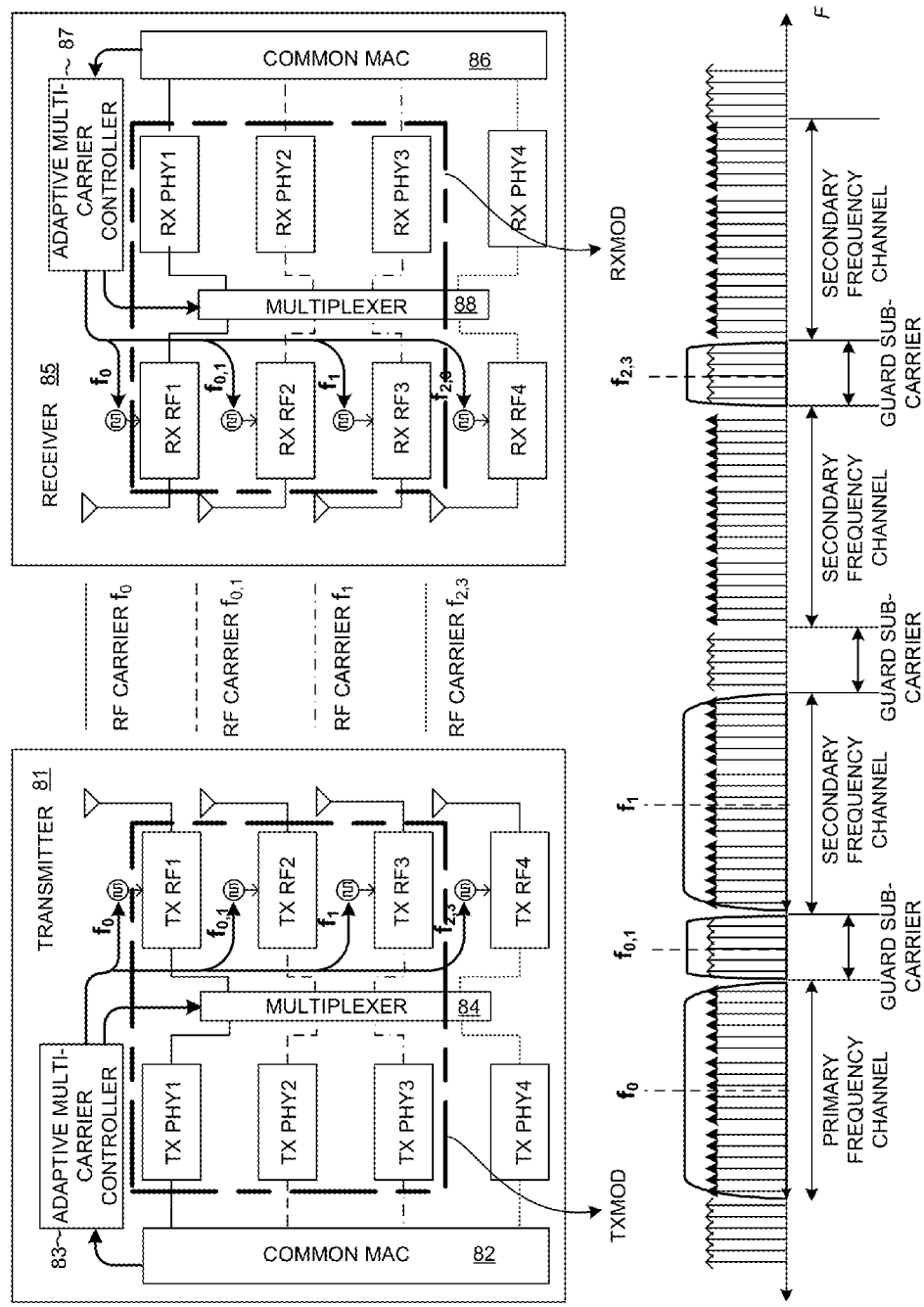
FIG. 11 illustrates one embodiment of the flexible multi-carrier transceiver architecture in a multi-carrier wireless system to support data transmission over guard sub-carriers.

Furthermore, such flexible multi-carrier transceiver architecture can be used to support data transmission over guard sub-carriers. FIG. 11 illustrates one embodiment of the flexible multi-carrier transceiver architecture in multi-carrier wireless system 80 to support data transmission over guard sub-carriers. In the example of FIG. 11, TXPHY1, TXRF1, RXPHY1 and RXRF1 are configured and controlled to process and transmit a first radio signal associated with frequency channels #1 having a RF carrier frequency of $f_0$, which is the Primary Frequency Channel. TXPHY2, TXRF2, RXPHY2 and RXRF2 are configured and controlled to process and transmit a second radio signal associated with a number of guard sub-carriers having a RF carrier frequency of $f_{0,1}$, which is the Subsidiary Frequency Channel in between adjacent frequency channels #1 and #2. TXPHY3, TXRF3, RXPHY3 and RXRF3 are configured and controlled to process and transmit a third radio signal associated with frequency channels #2 having a RF carrier frequency of $f_1$, which is the Secondary Frequency Channel. TXPHY4, TXRF4, RXPHY4 and RXRF4 are configured and controlled to process and transmit a fourth radio signal associated with a number of guard sub-carriers having a RF carrier frequency of $f_{2,3}$, which is the Subsidiary Frequency Channel in between adjacent frequency channels #3 and #4. Thus, the same hardware modules and components used for multi-carrier and/or MIMO/SISO data transmission can also be used for data transmission over guard sub-carriers. There are no restrictions on each carrier location to be used, and the system can flexibly enable or disable each carrier based on system condition such as loading and traffic demand.

As illustrated above with respect to FIG. 4, there are two different hardware methods to implement data transmission over two contiguous frequency channels. In the example of FIG. 11, implementation method #1 is used because physical layer entities TXPHY1-TXPHY3 and RXPHY1-RXPHY3 and RF entities TXRF1-TXRF3 and RXRF1-RXRF3 are depicted as three separate baseband hardware modules and three independent narrow-band RF filters. In consistent with the implementation method #2 illustrated above with respect to FIG. 4, however, those physical layer entities and RF entities may be implemented by using one single baseband hardware module and one wide-band RF filer. For example, TXPHY1-TXPHY3, RXPHY1-RXPHY3 and TXRF1-TXRF3, RXRF1-RXRF3 may be implemented by sharing one single baseband hardware module (TXMOD or RXMOD), which utilizes one single FFT and one wide-band RF filter to generate and transmit/receive three OFDMA radio signals in parallel. The OFDMA radio signals generated using single baseband hardware module are equivalent to the OFDMA radio signals generated by three separate baseband hardware modules having corresponding RF carrier frequencies. In addition, part of the RF entities (i.e., antennas) can be shared for both implementation methods.

Figure 12:
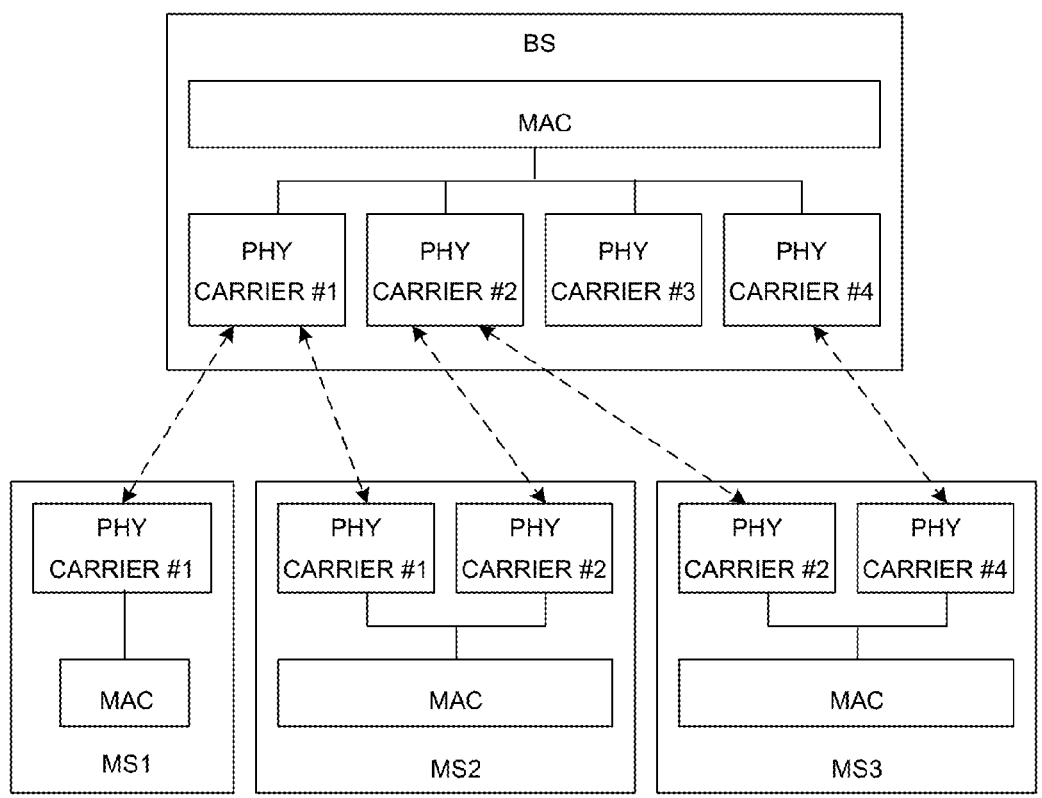
FIG. 12 illustrates another example of the flexible transceiver architecture to support multi-carrier operation.

FIG. 12 illustrates another example of the flexible transceiver architecture to support multi-carrier operation. For a serving base station BS, it supports all RF carriers for serving different mobile stations (MS1-MS3). On the other hand, each mobile station may support only single-carrier transmission (e.g. MS1), multi-carrier transmission over contiguous frequency channels (e.g. MS2), or multi-carrier transmission over non-contiguous carriers (e.g. MS3). For a mobile station that supports two contiguous 10 MHz frequency channels (e.g. MS2), one example to implement its transceiver hardware is to utilize a single 2048 FFT and a 20 MHz bandwidth RF filter to transmit 2×10 MHz OFDMA signals through two adjacent frequency channels. Using this implementation method, the overlapped sub-carriers are always aligned and the mobile station can easily transmit radio signals over the guard sub-carriers between the two adjacent frequency channels.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A wireless device, comprising:
   a plurality of radio frequency (RF) entities coupled to a plurality of antennas;
   a plurality of physical layer entities coupled to the plurality of RF entities through a multiplexer, wherein a first and a second physical layer entities are configured to process radio signals associated with two adjacent frequency channels having a first and a second RF carrier frequencies, wherein a third physical layer entity is configured to process a third radio signal associated with a plurality of guard sub-carriers between the two adjacent frequency channels having a third RF carrier frequency;
   a common MAC control entity coupled to each physical layer entity, wherein each physical layer entity is configured to process one or multiple radio signals associated with one or multiple frequency channels; and
   an adaptive multi-carrier controller that controls an RF carrier frequency of each RF entity, wherein each RF entity receives and transmits one or multiple radio signals associated with one or multiple corresponding frequency channels, and wherein the plurality of guard subcarriers is aligned to be orthogonal to normal data subcarriers by applying a frequency offset to one of the two adjacent frequency channels, wherein a number of aligned guard subcarriers are identified and partitioned to contain at least one predefined physical resource unit for data communication except at least one reserved guard subcarrier.

2. The device of claim 1, wherein one of the physical layer entities is configured to process a radio signal associated with a first active frequency channel, and wherein at least two of the RF entities receive and transmit the radio signal associated with the first active frequency channel for multiple-input multiple-output (MIMO) support.

3. The device of claim 2, wherein the device is part of a mobile station, and wherein the number of antennas to support MIMO is equal to a total number of antennas divided by a number of active frequency channels supported by the mobile station.

4. The device of claim 1, wherein the first, second, and third physical layer entities are implemented by sharing one single baseband hardware module, and wherein said single baseband hardware processes radio signals associated with the same frequency channels having the same first, second, and third RF carrier frequencies.

5. The device of claim 4, wherein the RF carrier frequencies of the RF entities to jointly transmit or receive the first, second, and third radio signals are the same.

6. An apparatus, comprising:
   a plurality of radio frequency (RF) entities coupled to a plurality of antennas;
   a plurality of physical layer entities coupled to the plurality of RF entities through a multiplexer, wherein a first and a second physical layer entities are configured to process radio signals associated with two adjacent frequency channels having a first and a second RF carrier frequencies, wherein a third physical layer entity is configured to process a third radio signal associated with a plurality of guard sub-carriers between the two adjacent frequency channels having a third RF carrier frequency; and
   means for configuring each physical layer entity to process one or multiple radio signals associated with one or multiple frequency channels, wherein the means is also for controlling an RF carrier frequency of each RF entity such that each RF entity receives and transmits one or multiple radio signals associated with one or multiple corresponding frequency channels, and wherein the plurality of guard subcarriers is aligned to be orthogonal to normal data subcarriers by applying a frequency offset to one of the two adjacent frequency channels, wherein a number of aligned guard subcarriers are identified and partitioned to contain at least one predefined physical resource unit for data communication except at least one reserved guard subcarrier.

7. The apparatus of claim 6, wherein one of the physical layer entities is configured to process a radio signal associated with a first active frequency channel, and wherein at least two of the RF entities receive and transmit the radio signal associated with the first active frequency channel for multiple-input multiple-output (MIMO) support.

8. The apparatus of claim 7, wherein the apparatus is part of a mobile station, and wherein the number of antennas to support MIMO is equal to a total number of antennas divided by a number of active frequency channels supported by the mobile station.

9. The apparatus of claim 6, wherein the first, second, and third physical layer entities are implemented by sharing one single baseband hardware module, and wherein said single baseband hardware processes radio signals associated with the same frequency channels having the same first, second, and third RF carrier frequencies.

10. The device of claim 9, wherein the RF carrier frequencies of the RF entities to jointly transmit or receive the first, second, and third radio signals are the same.

11. A method, comprising:
   receiving radio signals from a plurality of antennas coupled to a plurality of radio frequency (RF) entities of a wireless device;
   configuring a plurality of physical layer entities to process one or multiple radio signals associated with one or multiple frequency channels, wherein the plurality of physical layer entities are coupled to the plurality of RF entities through a multiplexer, wherein a first and a second physical layer entities are configured to process radio signals associated with two adjacent frequency channels having a first and a second RF carrier frequencies, wherein a third physical layer entity is configured to process a third radio signal associated with a plurality of guard sub-carriers between the two adjacent frequency channels having a third RF carrier frequency; and
   controlling an RF carrier frequency of each RF entity such that each RF entity receives and transmits one or multiple radio signals associated with one or multiple corresponding frequency channels, wherein the plurality of guard subcarriers is aligned to be orthogonal to normal data subcarriers by applying a frequency offset to one of the two adjacent frequency channels, wherein a number of aligned guard subcarriers are identified and partitioned to contain at least one predefined physical resource unit for data communication except at least one reserved guard subcarrier.

12. The method of claim 11, wherein one of the physical layer entities is configured to process a radio signal associated with a first active frequency channel, and wherein at least two of the RF entities receive and transmit the radio signal associated with the first active frequency channel for multiple-input multiple-output (MIMO) support.

13. The method of claim 12, wherein the device is part of a mobile station, and wherein the number of antennas to support MIMO is equal to a total number of antennas divided by a number of active frequency channels supported by the mobile station.

14. The method of claim 11, wherein the first, second, and third physical layer entities are implemented by sharing one single baseband hardware module, and wherein said single baseband hardware processes radio signals associated with the same frequency channels having the same first, second, and third RF carrier frequencies.

15. The method of claim 14, wherein the RF carrier frequencies of the RF entities to jointly transmit or receive the first, second, and third radio signals are the same.

* * * * *